United States Patent [19]

Hong et al.

[11] Patent Number: 5,358,645
[45] Date of Patent: Oct. 25, 1994

[54] ZIRCONIUM OXIDE CERAMICS FOR SURFACES EXPOSED TO HIGH TEMPERATURE WATER OXIDATION ENVIRONMENTS

[75] Inventors: Glenn T. Hong, Tewksbury; William R. Killilea, West Chelmsford; David W. Ordway, Natick, all of Mass.

[73] Assignee: Modar, Inc., Houston, Tex.

[21] Appl. No.: 935,408

[22] Filed: Aug. 26, 1992

Related U.S. Application Data

[63] Continuation of Ser. No. 682,465, Apr. 9, 1991, abandoned.

[51] Int. Cl.$^5$ .................................................. C02F 11/08
[52] U.S. Cl. ................................. 210/761; 210/762; 422/7
[58] Field of Search ................ 210/721, 758, 761–763, 210/766, 177, 178, 180, 205; 422/7, 8, 241

[56] References Cited

U.S. PATENT DOCUMENTS

| | | | |
|---|---|---|---|
| 2,665,249 | 3/1950 | Zimmerman | 210/761 |
| 2,944,396 | 7/1960 | Barton et al. | 210/761 |
| 4,052,302 | 10/1977 | Fletcher et al. | 210/762 |
| 4,292,953 | 10/1981 | Dickinson | 110/106 |
| 4,294,706 | 10/1981 | Kakihara et al. | 210/762 |
| 4,338,199 | 7/1982 | Modell | 210/761 |
| 4,543,190 | 9/1985 | Modell | 210/761 |
| 4,604,215 | 8/1986 | McCorquodale | 210/762 |
| 4,751,005 | 6/1988 | Mitsui et al. | 210/762 |

FOREIGN PATENT DOCUMENTS

| | | |
|---|---|---|
| 0414558A1 | 2/1991 | European Pat. Off. |
| 58-64188 | 3/1983 | Japan. |
| 59-19757 | 2/1984 | Japan. |

OTHER PUBLICATIONS

The Stebbins Engineering and Manufacturing Co., A Brief Profile—Red Book "Low Temperature Degradation of Y-TZP Materials", Jefrey J. Swab, Jan. 1990.
Derwent Publications Ltd., London GB; AN 89-013671 & JP-A-63 291 874 (Shinagawa Fire Brick); 29 Nov. 1988; Abstract.

*Primary Examiner*—Thomas Wyse
*Attorney, Agent, or Firm*—Pravel, Hewitt, Kimball & Krieger

[57] ABSTRACT

Disclosed is an apparatus and a process for high temperature water oxidation of combustibles in which during at least a part of the oxidation, corrosive material is present and makes contact with at least a portion of the apparatus over a contact area on the apparatus, wherein at least a portion of the contact surface area comprises a zirconia based ceramic, with the temperature of the oxidation process in excess of about 300° C. and the pressure of the oxidation process is in excess of about 27.5 bar (400 psi).

18 Claims, 3 Drawing Sheets

ZIRCONIUM OXIDE CERAMICS FOR SURFACES EXPOSED TO HIGH TEMPERATURE WATER OXIDATION ENVIRONMENTS

This is a continuation of application Ser. No. 07/682,465 filed Apr. 9, 1991, abandoned.

BACKGROUND OF THE INVENTION

1. Field of the Invention

The present invention relates to wet oxidation processes and apparatus. More particularly, this invention relates to apparatus which utilize zirconium oxide ceramics for surfaces exposed to high temperature water oxidation environments, and to water oxidation processes conducted therein.

2. Description of the Related Art

Wet oxidation is a process that involves the addition of an oxidizing agent, generally air or oxygen, to an aqueous stream, at temperatures and pressures sufficient to cause the "combustion" of oxidizable materials directly within the aqueous phase. Typical wet oxidation temperatures and pressures are generally in the range of about 150° C. to about 370° C. and in the range of about 30 to about 250 bar (3626 psia). Wet oxidation has been used for the treatment of aqueous streams for many years. For example, U.S. Pat. No. 2,665,249, issued Jan. 5, 1954 to Zimmermann discloses oxidation in the aqueous phase of carbonaceous dispersions.

Wet oxidation as such is limited by the degree of oxidation achievable, an inability to adequately handle refractory compounds, slow reaction times, and lack of usefulness for power recovery due to the low temperature of the process. Much development in the process of wet oxidation has been in the direction of increasing the operating temperatures and pressures.

In an effort to overcome some of the prior art limitations, U.S. Pat. No. 2,944,396, issued July 12, 1960 to Barton et al. disclosed the addition of a second wet oxidation stage. The unoxidized volatile combustibles which accumulate in the vapor phase of the first stage are sent to complete their oxidation in the second stage, which is operated at temperatures above the critical temperature of water of about 374° C. U.S. Pat. No. 4,292,953, issued Oct. 6, 1981 to Dickinson, disclosed a modified wet oxidation process for power generation from coal and other fuels in which, as heat is liberated by combustion, the entire reaction mixture exceeds the critical temperature of water of about 374° C., with operative pressures of about 69 bar (1000 psi) to about 690 bar (10,000 psi) spanning both the sub- and supercritical water pressure ranges. U.S. Pat. No. 4,338,199 issued Jul. 6, 1982, to Modell, disclosed a wet oxidation process, sometimes known as supercritical water oxidation, in which the oxidation is initiated and carried out at supercritical temperatures (above about 374° C.) and pressures (above about 3200 psi or about 220 bar). With supercritical water oxidation (SCWO), almost any compound can be substantially completely oxidized in a matter of seconds, with destruction efficiencies on the order of 99.9999% easily obtainable. As a result, supercritical water oxidation is contemplated for the destruction of hazardous and toxic wastes, as an alternative to incineration.

For wet oxidation at temperatures below about 300° C. titanium metal has proven to be resistant to a wide spectrum of environments, and is an acceptable material of construction for such processes. Furthermore, stainless steel has proven suitable for high temperature liquid oxidation research in dealing with mixtures of water, oxygen and hydrocarbons, but it is anticipated that stainless steel will be inadequate Furthermore, stainless steel has proven suitable for high temperature liquid oxidation research in dealing with mixtures of water, oxygen and hydrocarbons, but it is anticipated that stainless steel will be inadequate for commercial systems which will have a variety of acidic, alkaline, and salty streams. The various processes for oxidation in an aqueous matrix will hereinafter be referred to collectively as high temperature water oxidation (HTWO) if carried out at temperatures above about 300° C., and at pressures generally in the range of about 27.5 bar (400 psi) to about 690 bar (10,000 psi). In high temperature water oxidation of toxic and hazardous wastes the unique operating conditions and chemical environment greatly limit the selection of materials of construction. This environment is described below for the particular case of SCWO, though other HTWO environments will have much in common.

As for describing the chemical environment, the products of complete oxidation in supercritical water oxidation are fairly well known. Carbon and hydrogen form the conventional combustion products $CO_2$ and $H_2O$. Chlorinated hydrocarbons also give rise to HCl, which will react with available cations to form chloride salts. Alkali may be intentionally added to the reactor to avoid high concentrations of hydrochloric acid. In contrast to normal combustion, which forms $SO_2$, the final product of sulfur oxidation in SCWO is sulfate anion. As in the case of chloride, alkali may be intentionally added to avoid high concentrations of sulfuric acid. Similarly, the product of phosphorus oxidation is phosphate anion.

While it is frequently desirable to neutralize oxidation product anions via alkali addition, the reverse is not usually true. Feedstocks containing excess noncombustible cations are generally self-neutralized by the $CO_2$ evolved from oxidation. For example, a stream containing organic sodium salts will yield sodium carbonate or bicarbonate as a product. Ammonium, another common cation, can be converted to water and dinitrogen ($N_2$) or nitrous oxide ($N_2O$) in the SCWO process, and so may not require neutralization.

A key advantage of SCWO over incineration is the lack of $NO_x$ formation due to the relatively low temperature of operation. Oxidized forms of nitrogen, e.g., organic nitro-compounds and nitrate anion, have been found to form $N_2$ or $N_2O$ to a greater or lesser degree, just as in the case of ammonia and other reduced forms such as proteins. When air is used as the process oxidant, the $N_2$ passes through the system as an inert.

The chemical environment of supercritical water oxidation when used for waste processing will frequently include mineral acids HCl, $H_2SO_4$, $HNO_3$, and $H_3PO_4$, the alkaline materials NaOH and $Na_2CO_3$, and various salts with cations such as Na, K, Ca, and Mg.

While the chemical components present in SCWO reactions are well documented, much remains to be learned about chemical kinetics and reaction mechanisms. The situation is complicated by the wide range of densities which can exist in supercritical water systems. At the typical reactor conditions the supercritical phase density is on the order of 0.1 g/cc. Reaction mechanisms are of the free radical type, as with normal combustion, through greatly affected by the much higher density and water concentration. On the other hand, at temperatures closer to the critical point, or in dense brine phases, densities of 0.5 to 1 g/cc and higher are obtained and ionic reaction mechanisms will dominate. Similarly, corrosion mechanisms will differ depending on operating conditions.

The corrosivity of a particular chemical is partly dependent upon its phase state. At typical SCWO reactor conditions with densities in the range of 0.1 g/cc, water molecules are considerably farther apart than in normal liquid water. Hydrogen bonding, a short-range phenomenon, has been almost entirely disrupted, and the water molecules lose the ordering responsible for many of liquid water's characteristic properties. In particular, solubility behavior is closer to that of high pressure steam than to liquid water. Smaller polar and non-polar organic compounds, with relatively high volatility, will exist as vapors at typical SCWO conditions and hence be completely miscible with supercritical water. Gases such as $N_2$, $O_2$, and $CO_2$ show similar complete miscibility. Larger organic compounds and polymers will largely pyrolyze to smaller molecules at typical SCWO conditions, resulting in solubilization via chemical reaction. The loss of bulk polarity by the water phase has striking effects on normally water-soluble salts, as well. No longer readily solvated by water molecules, they precipitate out as solids or dense brines. The small salt residual in the supercritical phase is largely present in molecular form, e.g., as NaCl molecules. Heavy metal oxides, of low solubility in liquid water, retain their low solubility at supercritical water conditions. Exceptions exist and high solubilities occur, however, when a metal can form a volatile salt, oxide, or elemental compound at reactor temperatures.

The preceding characterization of solubility behavior has been given in relation to pure supercritical water. In actual SCWO systems, this behavior can be greatly altered by the presence of large quantities of gases and salts. In many applications, for example, the mass of "noncondensible" gases such as $N_2$ and $O_2$ in the reactor may exceed the mass of water present. The presence of noncondensible gases and salts in the SCWO reactor encourages the separation of phases, similar to the familiar phenomenon of "salting out" of gases from solution.

The combination of highly oxidizing conditions, acid gases, and caustic or high salt solids and dense brines described here is an extremely aggressive chemical environment. In addition to the harsh chemical environment, the operating conditions in HTWO are also very demanding. Any materials utilized in a high temperature liquid oxidation system will have to withstand temperatures and pressures of at least about 300° C. and about 27.5 bar (400 psi), and in some instances even ranging up to and exceeding 600° C. and 690 bar (10,000 psi). The materials must also withstand thermal shock which may be imposed intentionally or under upset conditions.

Although high nickel alloys such as Hastelloy C-276 or Inconel Alloy 625 have been suggested for use as materials of construction for high temperature wet oxidation reactors (see U.S. Pat. No. 4,543,190), test data indicate that such materials exhibit unacceptably high corrosion rates at reactor conditions. Furthermore, prolonged exposure at and cycling of these materials to reactor temperatures leads to a degradation of their mechanical properties. Both alloys are subject to embrittlement, giving rise to the possibility of cracking and catastrophic failure. A large number of other metals and alloys have been tested with the hope of finding one suitable. Nevertheless, with the possible exception of certain noble metals too expensive for general usage, it now appears that no metal or alloy exists which has satisfactory corrosion resistance to commercially envisioned HTWO environments. Firebrick has also been suggested as a material of construction in large diameter SCWO reactors. Due to relatively high solubility, however, the alumina/silica composition of firebrick is unsuitable for many HTWO environments, especially when caustic materials such as NaOH and $Na_2CO_3$ are present.

Stubican et al., suggested in Science and Technology of Zirconia (1981) that stabilized zirconia ceramics might have application as heat-resistant linings in furnaces and as protective coatings on alloys. However, Stubican et al., did not disclose or suggest that such stabilized zirconia ceramics would be able to face the harsh environment of high temperature water oxidation. Furthermore, Swab, in Low Temperature Degradation of Y-TZP Materials (U.S Army Materials Technology Laboratory Report No. MTL TR 90-4, January 1990) while investigating the suitability of yttria stabilized zirconia for use in heat engines, discloses that such materials are susceptible to reactions with water vapor at temperatures from 200° C. to 400° C. This finding would suggest that such stabilized zirconia materials would be unsuitable for high temperature water oxidation.

Because of the unsuitability of metals and conventional ceramics for use as materials of construction for water oxidation systems in which temperatures above 300° C. are encountered, a need exists for a resistant material for use in constructing such systems.

SUMMARY OF THE INVENTION

According to an embodiment of the present invention there is provided a process for high temperature water oxidation of combustible material in a high-temperature water oxidation apparatus, in which corrosive material is present and contacts the apparatus over a contact area on the apparatus, the process comprising contacting in an aqueous phase the combustible material and an oxidizing agent under conditions suitable to cause the combustion of the combustible material, wherein the combustion is at temperatures exceeding 300° C., and at pressures exceeding about 27.5 bar (400 psi), and the contact area comprises a zirconia based ceramic.

According to another embodiment of the present invention there is provided an improvement to apparatus for high temperature water oxidation of combustibles at temperatures in excess of 300° C. and at pressures in excess of about 27.5 bar (400 psi), in which during at least a part of the oxidation, corrosive material is present and contacts at least a portion of the apparatus over a contact area on the apparatus, wherein the improvement is characterized by a contact surface area comprising a zirconia based ceramic.

DETAILED DESCRIPTION OF THE INVENTION

The zirconia based ceramics of the present invention will comprise $ZrO_2$ in an amount suitable to enable the ceramic to withstand the harsh conditions of the high temperature water oxidation process. Generally the ceramic will comprise in the range of about 70 to about 100 weight percent $ZrO_2$, preferably, in the range of about 85 to about 100 weight percent $ZrO_2$.

The zirconium oxide of the present invention may also be replaced by hafnium oxide ($HfO_2$), although at present this would be economically impractical. Since 2hafnium oxide is a structural analog of zirconium oxide, it does not affect crystal morphology. Hafnium oxide occurs as a feedstock impurity in zirconia ceramic manufacture, and typically comprises in the range of about 0 to about 10 weight percent of the ceramic. Preferably, hafnium oxide comprises in the range of about 0.25 to about 4 weight percent of the ceramic.

The porosity of the ceramic of the present invention is an important variable in determining the particular application within a high temperatures water oxidation system for which the ceramic is suitable.

Generally, zirconia based ceramics with porosities in the range of about 0 to about 10 percent are useful as materials of construction in a wide range of applications, such as for example, the casting of parts, bricks, and loose fill material. Zirconia based ceramics with porosities in the range of greater than about 10 to about 25 percent are useful as materials of construction for bricks and loose fill material. Zirconia based ceramics with porosities exceeding 25 percent are generally limited for use as materials of construction for loose fill material.

Depending on the process conditions, various crystalline forms of zirconium oxide can be utilized. The basic crystalline forms of zirconium oxide are monoclinic, tetragonal, and cubic. The stable form of essentially pure zirconium oxide between ambient temperature and 1170° C. is a monoclinic crystal. As temperatures are increased above 1170° C. the tetragonal form becomes the stable phase, with a concomitant change in specific volume. Because zirconia based ceramics must be fired above 1170° C., it is impossible to manufacture monoclinic pieces and then cool them to ambient temperatures, without their cracking. As a result, monoclinic material is only available in the form of chips, which are suitable for applications below 1170° C.

Figure 1:
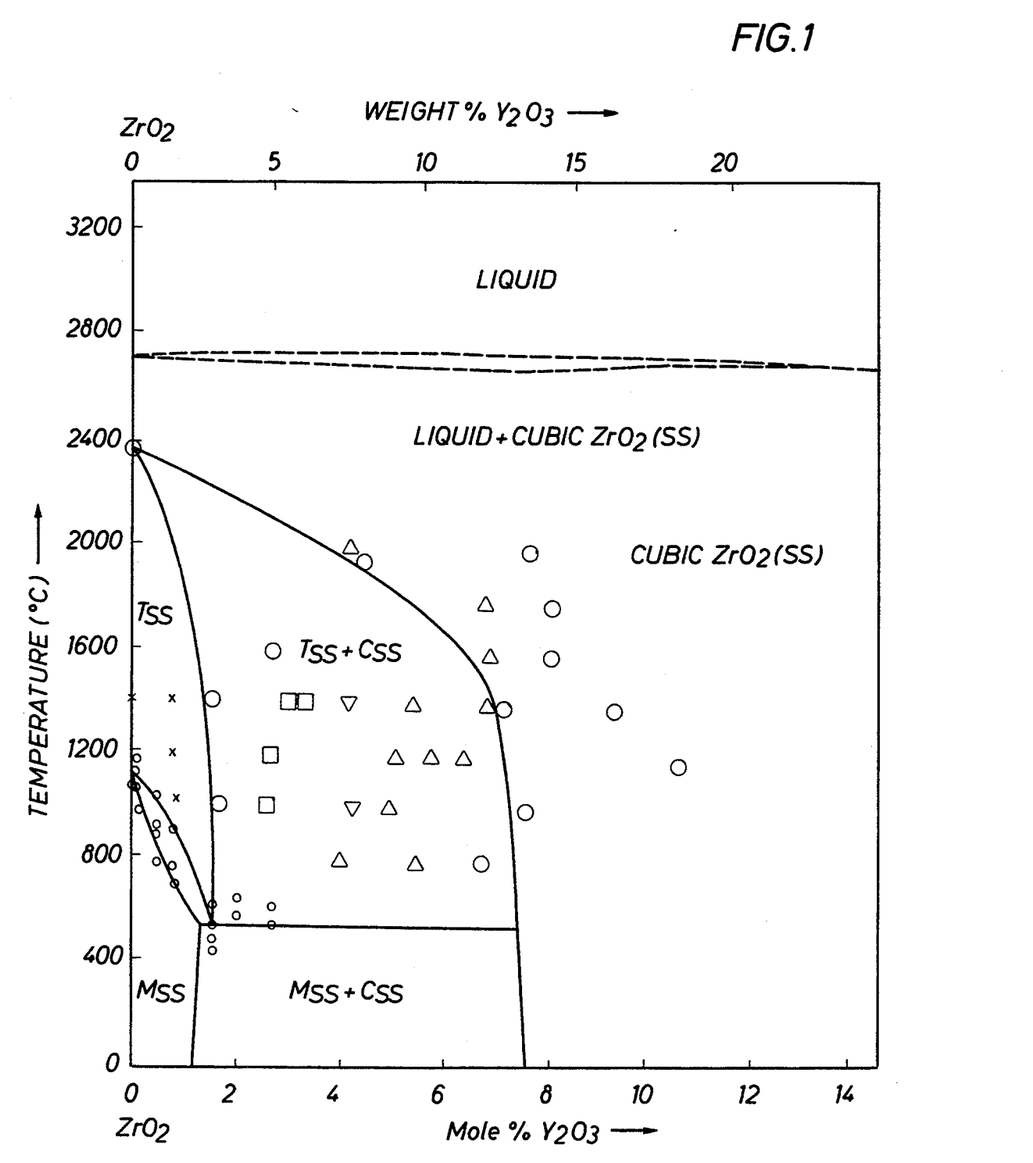
FIG. 1 shows the equilibrium phase diagram for yttria stabilized zirconia.
Figure 2:
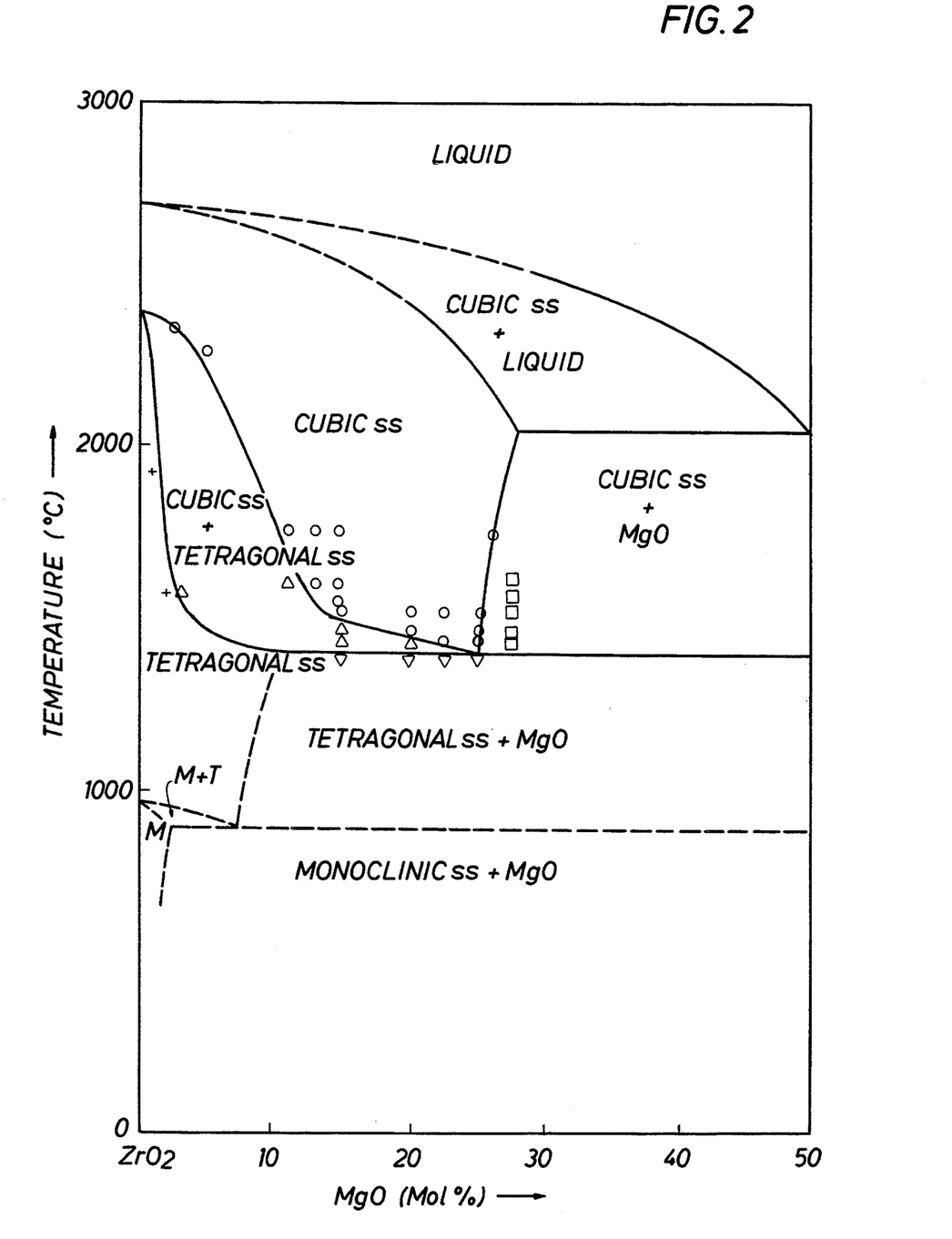
FIG. 2 shows the equilibrium phase diagram for magnesia stabilized zirconia.
Figure 3:
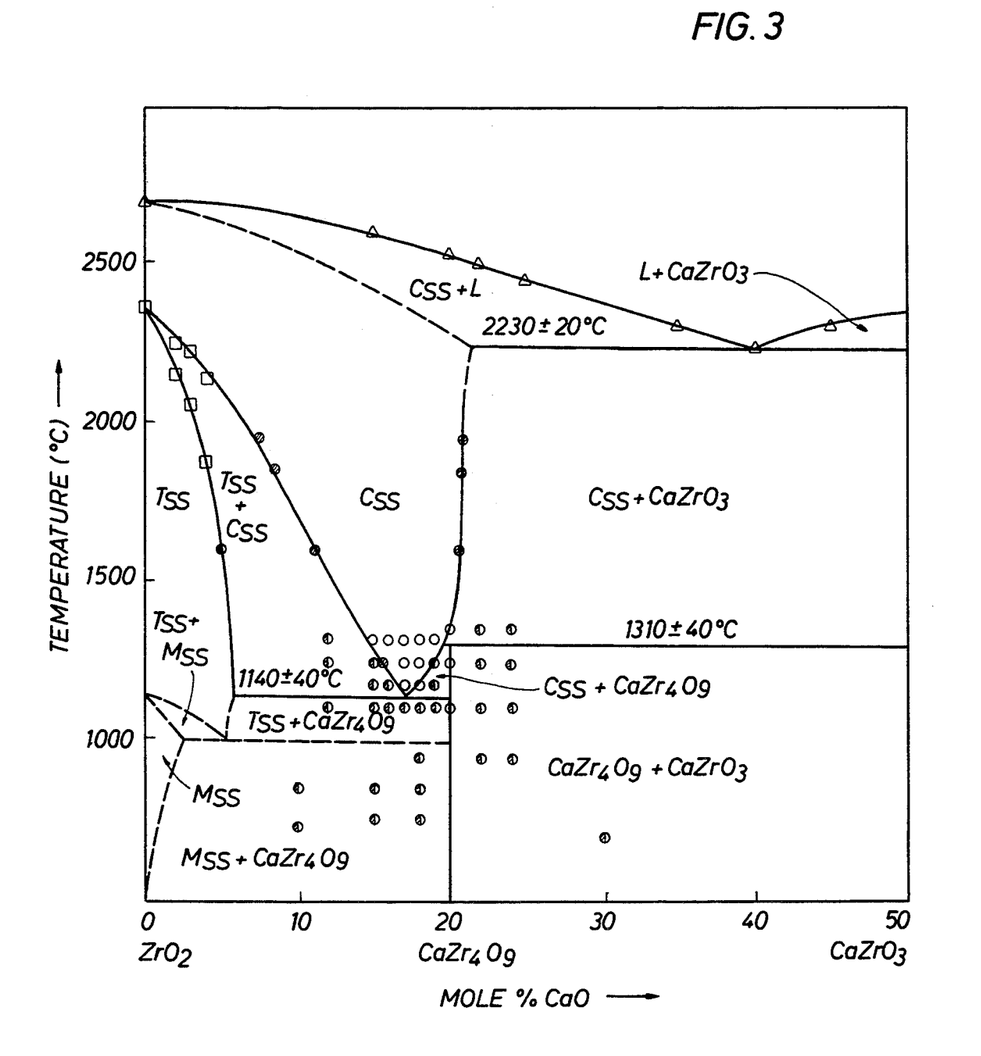
FIG. 3 shows the equilibrium phase diagram for calcia stabilized zirconia.

The problematic behavior of monoclinic zirconia in cycling to high temperatures has led to the use of stabilizing agents to increase its resistance to fracturing, the most common being yttria, magnesia, and calcia. FIGS. 1, 2 and 3 show how the addition of yttria, magnesia and calcia, respectively, alter the zirconia crystal structures. In the figures T represents the tetragonal phase, C the cubic phase, M the monoclinic phase, and SS stands for solid solution. The amount of stabilizer required will depend on the process conditions and the type of crystalline structure desired. Stabilizing agents will typically comprise in the range of about 0 to about 20 weight percent of the ceramic.

One phase that is of special interest is the partially stabilized zirconia (PSZ) which exhibits an unusual combination of high strength and toughness. PSZ comprises a mixture of monoclinic, cubic and metastable tetragonal phases, with the latter being of key importance in reducing the ceramics' brittleness. It is believed that the strength and toughness properties of PSZ stem from a stress-assisted "martensitic" transformation of the metastable tetragonal phase to the stable monoclinic phase. The absorption of the crack tip energy by the tetragonal phase grains in the vicinity of the crack tip causes the transformation resulting in reduced stress.

For yttria stabilized zirconia, the PSZ phase is found between about 1.5 to about 7.5 mole percent yttrium oxide at temperatures below about 500° C., see FIG. 1. The PSZ phase for magnesia stabilized zirconia is found at temperatures less than about 900° C. for magnesium oxide mole percents between about 0 and at least about 50, see FIG. 2. For calcia stabilized zirconia, the PSZ phase is found at temperatures less than about 1000° C. for calcium oxide mole percents between about 0 and about 20.

The choice of which stabilizing agent to use will depend upon the environment of the particular application. For example, magnesia stabilization appears preferable to calcia stabilization for sulfate and/or chloride bearing environments, presumably due to the potential for the conversion of calcium oxide to the sulfate or chloride.

In addition to the above stabilizing agents, the zirconia based ceramics of the present invention can comprise other minor components that are well known in the ceramics arts, with the limitation of course that the additional components do not severely detract from the suitability or the ceramic for high temperature water oxidation purposes. Such additional components include, aluminum oxide ($Al_2O_3$), titanium dioxide ($TiO_2$), silicon dioxide ($SiO_2$), and ferric oxide ($Fe_2O_3$), as well as potassium and sodium compounds. These additional materials are generally each present in amounts ranging from about 0 to about 10 weight percent of the ceramic, preferably in the range of about 0 to about 2 weight percent of the ceramic.

Zirconia based ceramics are useful as materials of construction for any part of a high temperature water oxidation system that will be exposed to the harsh conditions of the process. Zirconia based ceramics can be used in the construction of reactors, linings, pump parts, piping or tubing, nozzle parts, vessels, tanks, filters, windows, baffles, valve parts, gaskets, filler insulation, loose fill insulation or packing, bricks, and as inert additives and catalyst supports, for example.

The zirconia based ceramics can be made into the system parts that are exposed to the harsh high temperature water oxidation environment by methods well known in the ceramics arts. For example, the exposed areas of such parts can be coated with a zirconia based ceramic coating. The most common method of applying zirconia to metal surfaces is by plasma spraying, in which the substrate or base metal is frequently first sprayed with a metallic "bond coat" which has a coefficient of thermal expansion intermediate to the base metal and the ceramic coating. In addition to providing thermal expansion matching, the bond coat leaves a rough surface to allow good adhesion of the subsequently deposited ceramic layer.

An alternative approach to protecting metallice with ceramics is the use of separate ceramic structural elements. Such an approach might include the use of a thin ceramic lining with a clean fluid purge between the ceramic and the hot metallic wall, or the use of a thick insulating liner within a metallic vessel.

System parts could also be machined or cast from zirconia based ceramics using techniques well known in the ceramics arts.

Bricks of zirconia based ceramics could be used to line large diameter reactors and vessels in much the same fashion that firebrick is used to line furnaces. Loose pieces of zirconia based ceramics could be used as loose fill insulation between an inner zirconia brick liner and the reactor or vessel wall.

The zirconia based ceramics find utility in a wide variety of high temperature water oxidation conditions. At temperatures above about 300° C., the environment of a water oxidation process is such that zirconia based ceramics are a very suitable material of construction. Zirconia based ceramics are suitable at a wide range of pressures ranging from the sub- to the supercritical of about 27.5 bar (400 psi) to above about 690 bar (10,000 psi).

Generally high temperature water oxidation is conducted at temperatures above about 300° C. and at pressures ranging from the sub- to the supercritical of about 400 to above 10,000 psi. Preferably, high temperature water oxidation is conducted at temperatures in the range of about 400° C. to about 650° C. and at pressures ranging from about 27.5 bar (400 psi) to about 345 bar (5000 psi). Most preferably, high temperature water oxidation is conducted at temperatures in the range of about 500° C. to about 650° C. and at pressures ranging from about 27.5 bar (400 psi) to about 275 bar (4000 psi).

The zirconia based ceramics of the present invention find utility in a wide variety of reactor systems, including vessel reactors, pipe reactors, and hydraulic column reactors (deep well reactors).

The chemical environment of supercritical water oxidation when used for waste processing will frequently include corrosive materials which comprise at least one moiety selected from the group consisting of Cl, $SO_4$, $NO_3$, $PO_4$, $BO_2$, Br, OH, $CO_3$ and at least one moiety selected from the group consisting of H, Na, K, Ca, and Mg. Examples of such corrosive materials include the mineral acids HCl, $H_2SO_4$, $HNO_3$, and $H_3PO_4$, the alkaline materials NaOH and $Na_2CO_3$, and various salts with cations such as Na, K, Ca, and Mg.

EXAMPLES

Table 1 is a description of the various zirconium oxide types tested. Type Nos. 2, 5 and 9 were cubic crystalline structure, type Nos. 4 and 10 were monoclinic crystalline structure, and the remainder of the type Nos. 1–28, were partially stabilized zirconia.

TABLE 1

Zirconium oxide sample descriptions.

| Type No. | Supplier | Designation/ Description | Stabilizing Agent | Composition, wt % | | | | |
|---|---|---|---|---|---|---|---|---|
| | | | | $ZrO_2$ | $HfO_2$ | MgO | CaO | $Y_2O_3$ |
| 1. | APS | Plasma spray | Yttria | Bal. | — | — | — | — |
| 2. | Brunswick | GJ20/AM26 | Yttria | Bal. | — | — | — | 16 |
| 3. | Brunswick | Zircoa/AMI963 | Yttria | Bal. | — | — | — | 8 |
| 4. | Ceres | Monoclinic chips | None | 97 | 2 | — | — | — |
| 5. | Ceres | Single crystal gem | Yttria | Bal. | — | — | — | 16 |
| 6. | Coors | TTZ | Magnesia | Bal. | 3.5 | 3.0 | <0.2 | — |
| 7. | Cotronics | 760 castable | Yttria | Bal. | — | — | — | yes |
| 8. | Howmet | Y-PSZ-D | Yttria | Bal. | — | — | — | 3 |
| 9. | Nanmac | FSZ | Yttria | Bal. | — | — | — | >14 |
| 10. | Norton | H, monoclinic chips | None | Bal. | — | — | — | — |
| 11. | Norton | Rokide YZB | Yttria | Bal. | — | — | — | 8 |
| 12. | Norton | Rokide Z | Calcia | Bal. | — | — | Yes | — |
| 13. | Selee | PSZ | Yttria | Bal. | — | — | — | <16 |
| 14. | Selee | ZA | Yttria | Bal. | — | — | — | <10 |
| 15. | Zircar | Cement | Yttria | 86 | — | — | — | 8.8 |
| 16. | Zircar | FBD board | Yttria | 92 | — | — | — | 8 |
| 17. | Zircar | Rigidizer | Yttria | 92 | — | — | — | 8 |
| 18. | Zircar | ZYC cylinder | Yttria | 87 | — | — | — | 8 |
| 19. | Zircar | ZYF100 felt | Yttria | 92 | — | — | — | 8 |
| 20. | Zircar | ZYFB-3 board | Yttria | 92 | — | — | — | 8 |
| 21. | Zircar | ZYT rope | Yttria | 92 | — | — | — | 8 |
| 22. | Zircar | ZYW-30A cloth | Yttria | 92 | — | — | — | 8 |
| 23. | Zircoa | 1304 (Zirbeads) | Magnesia | 95.8 | — | 3.0 | — | — |
| 24. | Zircoa | 1372 | Yttria | Bal. | <0.25 | <0.6 | 0.35 | Yes |
| 25. | Zircoa | 1582 (Zycron G) | Magnesia | Bal. | <2.5 | 3.2 | <0.3 | — |
| 26. | Zircoa | 1651 | Calcia | 93.7 | — | 0.6 | 3.6 | — |
| 27. | Zircoa | 1706 | Magnesia | Bal. | <2.5 | 2.8 | <0.3 | — |
| 28. | Zircoa | 2043 | Magnesia | Bal. | — | 3.1 | 0.3 | — |

| Type No. | Composition, wt % | | | | | Crystal Structure | Porosity % |
|---|---|---|---|---|---|---|---|
| | $Al_2O_3$ | $SiO_2$ | $TiO_2$ | $Fe_2O_3$ | $K_2O/Na_2O$ | | |
| 1. | — | — | — | — | — | C + M + T | >10 |
| 2. | — | 0.5 | — | — | — | C | >38 |
| 3. | — | 0.5 | — | — | — | C + M + T | >21 |
| 4. | 0 | 0.15 | 0.15 | <0.006 | — | M | <0.1 |
| 5. | — | — | — | — | — | C | None |
| 6. | <0.2 | <0.2 | <0.2 | <0.2 | — | C + M + T | <0.1 |
| 7. | — | — | — | — | — | C + M + T | >10 |
| 8. | <1 | <3 | <0.1 | <0.1 | — | C + M + T | 31 |
| 9. | — | — | — | — | — | C | <0.1 |
| 10. | — | — | — | — | — | M | <0.1 |
| 11. | — | — | — | — | — | C + M + T | >10 |
| 12. | — | — | — | — | — | C + M + T | >10 |
| 13. | — | — | — | — | — | C + M + T | 80 |
| 14. | 35 | — | — | — | — | C + M + T | 80 |

TABLE 1-continued

Zirconium oxide sample descriptions.

| | | | | | | | |
|---|---|---|---|---|---|---|---|
| 15. | — | 3.6 | — | — | 1.2 | C + M + T | >10 |
| 16. | — | <0.3 | — | — | — | C + M + T | 70 |
| 17. | — | — | — | — | — | C + M + T | >10 |
| 18. | — | 5 | — | — | — | C + M + T | 91 |
| 19. | — | — | — | — | — | C + M + T | 96 |
| 20. | — | <0.3 | — | — | — | C + M + T | 92 |
| 21. | — | — | — | — | — | C + M + T | >80 |
| 22. | — | — | — | — | — | C + M + T | 83 |
| 23. | 0.3 | 0.5 | 0.2 | 0.2 | — | C + M + T | 6–8 |
| 24. | <0.25 | <0.25 | <0.25 | <0.15 | — | C + M + T | <0.1 |
| 25. | <0.3 | <0.3 | <0.2 | <0.2 | — | C + M + T | <0.1 |
| 26. | 0.8 | 0.8 | 0.3 | 0.3 | — | C + M + T | 25 |
| 27. | <0.2 | <0.6 | <0.2 | <0.2 | — | C + M + T | <0.1 |
| 28. | 0.3 | 1.2 | 0.2 | 0.2 | — | C + M + T | 22 |

Abbreviations:
C = Cubic
M = Monoclinic
T = Tetragonal
— = Not Determined

Example 1

Zirconia Based Ceramic Coatings

Table 2 shows the results of testing zirconia based ceramics as coatings in harsh high temperature water oxidation environments. The coatings were applied using plasma spray techniques well known in the art. lead to poorer adhesion of the coating during thermal cycling. Materials of the type described here could be suitable as higher porosity brick that could be utilized as an insulating layer between lower porosity zirconia ceramic brick and a vessel or reactor wall. These materials can also find utility as fill or loose fill insulation material.

TABLE 2

Zirconium oxide test descriptions

| Sample No. | Name | Sample Type (Table 1) | Stabilizing Agent/ % Porosity | pH | Environment Composition Major Salt/Acid/Base Constituents | Temp C. | Exposure Time hours | No. of Thermal Cycles | Notes |
|---|---|---|---|---|---|---|---|---|---|
| 1 | APS coating #1 | 1 | Y/>10 | 3.1 | Cl, F, Na | 625 | 3 | 1 | Ti base, NAA |
| 2 | APS coating #2 | 1 | Y/>10 | 3.3 | Ca, Cl, K, Mg, Na, PO4, SO4 | 640 | 9 | 2 | Ti base, grain |
| 3 | Brunswick coating #1 | 3 | Y/>21 | 2–11 | Ca, Cl, K, Li, Mg, Na, SO4 | 200–585 | 115 | 41 | 625 base, chipping and peeling |
| 4 | Brunswick coating #2 | 3 | Y/>21 | 2–11 | Ca, Cl, K, Li, Mg, Na, SO4 | 200–585 | 107 | 38 | 556 base, chipping and peeling |
| 5 | Brunswick coating #3 | 2 | Y/>38 | 2.0–4.0 | Cl, Na, SO4 | 585 | 13 | 6 | 625 base, peeling |
| 6 | Brunswick coating #4 | 3 | Y/>21 | 1.6–3.6 | Cl, Na, SO4 | 585 | 40 | 14 | 825 base, chipped |
| 7 | Brunswick coating #5 | 3 | Y/>21 | 1.6–3.6 | Cl, Na, SO4 | 200–585 | 17 | 6 | 304 base, chipped |
| 8 | Brunswick coating #6 | 3 | Y/>21 | 1.8–2.2 | Cl, Na, SO4 | 200–590 | 9 | 3 | 556 cylinder ID |
| 18 | Norton Coating #1 | 12 | C/>10 | 1.8 | Cl, K | 580 | 7 | 1 | 625 base, some coating separation |
| 19 | Norton coating #2 | 11 | Y/>10 | 2.9–3.9 | Ca, Cl, K, Na | 585 | 33 | 13 | 625 base, chipping and peeling |
| 20 | Norton coating #3 | 12 | C/>10 | 1.6–3.9 | Ca, Cl, K, Na | 585 | 43 | 17 | 625 base, chipping |

Notes:
1. Typical conditions - Pressure = 230 bar, oxygen partial pressure 2–7 bar.
2. pH given is for cooled liquid.
3. Carbonate is typically present in the environments used. It is listed only when it is a major constituent.
Abbreviations:
NA - Not applicable.
NAA - No apparent attack by visual examination Only sample No. 1 exhibited no apparent attack (NAA) by visual examination, and this is believed to be a result of the short exposure time. As indicated by the notes in Table 2, the primary problem with the remainder of the samples is the adhesion of the coating to the metallic bond coat, not the ceramics themselves. These materials could be utilized as coatings, provided that a proper bonding agent could be found. Alternatively, densification of the coatings might improve the protection of the bond coat from corrosive agents, and improve bonding. A difficulty with this approach, however, is that denser coatings are more rigid which in some instances may Example 2

High Porosity Zirconia Based Ceramics

Table 3 shows the results of testing on zirconia based ceramics having porosity greater than 10 percent.

While generally chemical resistant, these materials are unable to retain a cohesive large structure, developing cracks or gradually reverting to individual grains or fibers. Thus, these materials are suitable for use as loose fill insulation or otherwise in confined, purged, or clean spaces.

TABLE 3

| Sample No. | Name | Sample Type (Table 1) | Stabilizing Agent/ % Porosity | pH | Environment Composition Major Salt/Acid/Base Constituents | Temp C. | Exposure Time hours | No. of Thermal Cycles | Notes |
|---|---|---|---|---|---|---|---|---|---|
| 11 | Cotronics castable | 7 | Y/>10 | 4 | Cl, Na | 600 | 6 | 4 | General wastage |
| 12 | Howmet filter | 8 | Y/31 | 1.6–3.2 | Cl, Na, SO4 | 585 | 23 | 8 | Collapsed |
| 21 | Selee coupon | 13 | Y/80 | 0.8–2.2 | Cl, Na, SO4 | 570 | 79 | 12 | Weakened and broke |
| 22 | Selee filter #1 | 14 | Y/80 | 2.3 | Cl, Na | 620 | 4 | 1 | Weakened and cracked |
| 23 | Selee filter #2 | 14 | Y/80 | 1.9–3.2 | Cl, Na | 620 | 6 | 1 | Weakened and cracked |
| 24 | Selee filter #3 | 14 | Y/80 | 2.8 | Ca, Cl, K, Mg, Na, PO4, SO4 | 590 | 9 | 1 | Weakened and cracked |
| 25 | Selee filter #4 | 14 | Y/80 | 3.3 | Cl, Na, SO4 | 580 | 3 | 1 | Fell apart |
| 26 | Zircar board #1 | 16 | Y/70 | 4.1 | Cl, Na | 600 | 5 | 1 | Severely weakened |
| 27 | Zircar board #2 | 16 | Y/70 | 2.8 | Cl, Na | 630 | 5 | 2 | Severely weakened |
| 28 | Zircar board #3 | 20 | Y/92 | 2.8 | Cl, Na | 630 | 5 | 2 | Disintegrated |
| 29 | Zircar cloth with rigidizer | 22 17 | Y/83 Y/>10 | 1.8–2.3 | Cl, Na, SO4 | 565 | 5 | 1 | Severely weakened |
| 30 | Zircar cloth with cement | 22 15 | Y/83 Y/>10 | 1.8–2.3 | Cl, Na, SO4 | 565 | 5 | 1 | Severely weakened |
| 31 | Zircar felt | 19 | Y/96 | 1.7–2.4 | Cl, Na, SO4 | 100–200 | 6 | NA | Disintegrated |
| 32 | Zircar felt with rigidizer | 19 17 | Y/96 Y/>10 | 8–11 | Cl, Na, SO4 | 100–200 | 9 | NA | Severely weakened |
| 33 | Zircar felt with cement | 19 15 | Y/96 Y/>10 | 8–11 | Cl, Na, SO4 | 100–200 | 9 | NA | Severely weakened |
| 34 | Zircar fibrous cylinder | 18 | Y/91 | 1.4 | SO4 | 575 | 7 | 2 | Severely weakened |
| 35 | Zircar rope | 21 | Y/>80 | 1.4 | SO4 | 575 | 7 | 2 | Disintegrated |
| 36 | Zircoa CSZ coupon | 26 | C/25 | 1.6–3.8 | Ca, Cl, K, Li, Mg, Na, SO4 | 585 | 256 | 92 | Weakened and broke |
| 37 | Zircoa CSZ filter | 26 | C/25 | 2.9–3.9 | Ca, Cl, Na, SO4 | 580 | 20 | 9 | Cracked |
| 38 | Zircoa CSZ ring | 26 | C/25 | 8–11 | Cl, Na, SO4 | 100–200 | 32 | NA | Weakened and broke |
| 39 | Zircoa MSZ coupon | 28 | M/22 | 1.3–6.0 | Ca, Cl, K, Li, Mg, Na, SO4 | 100–200, 585 | 533 | 190 | Weakened and broke |
| 40 | Zircoa MSZ filter | 28 | M/22 | 2.1–3.8 | Ca, Cl, K, Li, Mg, Na, SO4 | 580 | 67 | 24 | Cracked, 6% MgO loss |
| 42 | Zircoa MSZ liner top | 28 | M/22 | 2–11 | Cl, Na, SO4, Zn | 200–440 | 214 | 40 | Slight cracking |
| 43 | Zircoa MSZ ring | 28 | M/22 | 8–11 | Cl, Na, SO4 | 100–200 | 90 | NA | Weakened and broke |
| 59 | Zircoa cup insulator | 28 | M/22 | 1.6–4 | Cl, Na, SO4 | 540 | 19 | 5 | NAA |

Notes:
1. Typical conditions - Pressure = 230 bar, oxygen partial pressure = 2–7 bar.
2. pH given is for cooled liquid.
3. Carbonate is typically present in the environments used. It is listed only when it is a major constituent.
Abbreviations:
NA - Not applicable.
NAA - No apparent attack by visual examination

Example 3
Low Porosity Zirconia Based Ceramics

Table 4 shows the results of testing on zirconia based ceramics having porosity less than about 10 percent.

TABLE 4

| Sample No. | Name | Sample Type (Table 1) | Stabilizing Agent/ % Porosity | pH | Environment Composition Major Salt/Acid/Base Constituents | Temp C. | Exposure Time hours | No. of Thermal Cycles | Notes |
|---|---|---|---|---|---|---|---|---|---|
| 9 | Ceres chips | 4 | NA/<0.1 | 1.6–3.6 | Cl, Na, SO4 | 570 | 4 | 2 | NAA |
| 10 | Ceres gem | 5 | Y/0 | 3.5 | None | 570 | 9 | 2 | NAA, mirror finish retained |
| 13 | Metal Samples washer | 6 | M/<0.1 | 1.5–3.7 | Na, NO3, SO4 | 100–650 | 25 | 2 | NAA 12 samples |
| 14 | Metal Samples washer | 6 | M/<0.1 | 1.7–11.3 | Cl, CO3, Na, SO4 | 200–590 | 167 | 2 | NAA, 14 samples |
| 15 | Metal Samples washer | 6 | M/<0.1 | 5–7 | Na, NO3, SO4 | 100–350 | 10 | 1 | NAA, 66 samples |
| 16 | Nanmac TC tube | 9 | Y/<0.1 | 2.3 | Ca, Cl, F, Na, PO4 | 620 | 2 | 1 | NAA |
| 17 | Norton chips | 10 | NA/<0.1 | 1.8–2.2 | Cl, Na, SO4 | 570 | 17 | 4 | NAA |
| 41 | Zircoa MSZ liner bottom | 25 | M/<0.1 | 1.5–11 | Cl, Na, NO3, SO4, Zn | 100–200 | 569 | NA | NAA |
| 44 | Zircoa MSZ | 27 | M/<0.1 | 5–6 | CO3, Na, SO4 | 585 | 8 | 1 | NAA |

TABLE 4-continued

| Sample No. | Name | Sample Type (Table 1) | Stabilizing Agent/ % Porosity | pH | Environment Composition Major Salt/Acid/Base Constituents | Temp C. | Exposure Time hours | No. of Thermal Cycles | Notes |
|---|---|---|---|---|---|---|---|---|---|
| 45 | Zircoa MSZ tube #1 | 27 | M/<0.1 | 8-11 | Cl, Na, SO4 | 100-200 | 139 | NA | NAA |
| 46 | Zircoa MSZ tube #2 | 27 | M/<0.1 | 6-7 | Na, NO3, SO4 | 340 | 10 | 1 | NAA |
| 47 | Zircoa MSZ tube #3 | 27 | M/<0.1 | 6-7 | Na, NO3, SO4 | 340 | 10 | 1 | NAA no 02 present |
| 48 | Zircoa YSZ tube #4 | 24 | Y/<0.1 | 1.5-4 | Na, NO3, SO4 | 530 | 44 | 5 | 0.5% weight loss |
| 49 | Zircoa YSZ tube #1 | 24 | Y/<0.1 | 3-5 | CO3, Na, SO4 | 580 | 15 | 2 | NAA |
| 50 | Zircoa Zirbeads #1 - 20 + 28 | 23 | M/6-8 | 2-3 | Cl, Na, SO4 | 570 | 47 | 14 | NAA |
| 51 | Zircoa Zirbeads #2 - 8 + 12 | 23 | M/6-8 | 2.2 | Cl, Na, S04 | 580 | 6 | 1 | NAA |
| 52 | Zircoa Zirbeads #3 - 8 + 12 | 23 | M/6-8 | 1.3-7 | Ca, Cl, K, Li, Mg, Na, SO4 | 580 | 1243 | 240 | NAA except w/H2SO4-alone |
| 53 | Zircoa Zirbeads #4 - 8 + 12 | 23 | M/6-8 | 1.5-2.1 | BO2, Li, PO4, SO4 | 420 | 9 | 1 | NAA |
| 54 | Zircoa Zirbeads #5 - 8 + 12 | 23 | M/6-8 | 1.5-7 | CO3, Na, NO3, SO4 | 340-590 | 93 | 11 | NAA |
| 55 | Zircoa Zirbeads #6 - 8 + 12 | 23 | M/6-8 | 1.8-2.4 | Cl, Na | 585 | 6 | 1 | NAA |
| 56 | Zircoa Zycron G #1 | 25 | M/<0.1 | 1.7-3.5 | Cl, Na, SO4 | 580 | 167 | 2 | NAA, 2 samples |
| 57 | Zircoa Zycron G #2 | 25 | M/<0.1 | 2-11 | Cl, CO3, Na, SO4 | 440 | 167 | 2 | NAA |
| 58 | Zircoa Zycron G #3 | 25 | M/<0.1 | 7-11.3 | Cl, CO3, Na, SO4 | 200 | 167 | 2 | NAA |

Notes:
1. Typical conditions - Pressure = 230 bar, oxygen partial pressure = 2-7 bar.
2. pH given is for cooled liquid.
3. Carbonate in typically present in the environments used. It is listed only when it is a major constituent.
Abbreviations:
NA - Not applicable.
NAA - No apparent attack by visual examination Comparison of high porosity sample data from Example 2, with low porosity sample data of this Example for similar conditions and materials shows the effects of high porosity.

For instance, sample No. 52, magnesia stabilized with 6-8% porosity, and sample No. 40 (Table 3), magnesia stabilized with 22% porosity, were both subjected to Ca, Cl, K, Li, Mg, Na, and $SO_4$ at 580° C., yet the high porosity sample cracked after only 67 hours and 24 thermal cycles, while the low porosity sample showed no apparent attack (NAA) by visual examination after 1243 hours and 240 thermal cycles. The lower silica content of the low porosity sample may also contribute to its greater resistance. As mentioned, silica is fairly soluble under certain HTWO conditions.

Example 4

In order to test the suitability of the high nickel alloy Inconel 625 for SCWO environments, a nonstressed coupon was exposed during a number of experiments over a two year period. The sample was at temperatures in the range of 600° C. for a total of 680 hours, at a pressure of approximately 230 bar (3336 psia), and experienced over 100 cycles between ambient and reactor conditions. Constituents present in a typical experiment included water, nitrogen, oxygen, carbon dioxide, hydrochloric acid, sulfuric acid, sodium chloride, sodium sulfate, and sodium carbonate, at levels commonly found in the treatment of hazardous waste streams. The Inconel coupon experienced general wastage at a rate of approximately 150 mils per year, several times higher at least than what is normally considered acceptable. The high corrosion rate has the deleterious side effect of contributing toxic heavy metal ions such as nickel and chromium to the SCWO process effluents. There were no indications that metal passivation was occurring, i.e., that a stable protective scale was forming so that the corrosion rate was slowing with time. The results obtained with Inconel 625 are indicative of the rapid attack that would be observed with other high nickel alloys, for example Hastelloy C276.

Example 5

Zirconia Based Ceramics vs. Firebrick

In addition to zirconia sample nos. 14, 57 and 58 (Table 4), coupons of alumina-silica acid brick (a typical firebrick), Refrax silicon carbide brick, and Masrock silica brick were exposed to a SCWO environment containing 5300 ppm chloride, 4100 ppm sodium and 1600 ppm sulfate. Solids precipitated on and adhering to the samples included sodium chloride, sodium sulfate, and sodium carbonate. Exposure time was 167 hours at temperatures ranging from 220° C. to 580° C. Table 5 shows the weight change results for the various samples.

TABLE 5

| Nominal Temp. °C. | Assembly No. 1 | | Assembly No. 2 | |
|---|---|---|---|---|
| | Material | Wt. Change | Material | Wt. Change |
| 580 | MS Zirconia[1] | 0.0% | MS Zirconia[1] | +0.5% |
| 580 | Refrax | +10.2% | Masrock | Shattered |
| 540 | Acid Brick | +12.9% | Refrax | -3.5% |
| 440 | MS Zirconia[2] | 0.0% | Refrax | -1.6% |
| 290 | — | — | Acid Brick | +3.7% |

TABLE 5-continued

| Nominal Temp. °C. | Assembly No. 1 Material | Wt. Change | Assembly No. 2 Material | Wt. Change |
|---|---|---|---|---|
| 200 | MS Zirconia[3] | +0.25% | Refrax | −20.7% |

[1]Sample No. 56 from Table 4
[2]Sample No. 57 from Table 4
[3]Sample No. 58 from Table 4

Zirconia performed well over the entire temperature range of 220° C. to 580° C. Minor weight gains as seen on some of the zirconia samples are not a serious concern, as some surface deposition and discoloration due to corrosion products from other components of the test system and other samples was observed. Substantial weight gains, however, as observed with the acid brick samples, indicate significant intercalation of the foreign material with a high likelihood of short term cracking.

The zirconia samples listed in Table 5, and new and used Zirbeads (Table 1, type No. 23), were subjected to EDAX (energy dispersive analysis of x-rays) to further define their stability. Table 6 summarizes these results, with sample numbers corresponding to those in Table 4. EDAX is only sensitive to elements of atomic number 11 (sodium) and higher, so the table values unfortunately do not include the key element oxygen. Analyses are normalized to 100% based on elements detected. The samples numbered 14A-C show a somewhat lower level of hafnium at the surface as compared to the interior. The constancy of the ratio between the two for each sample, over such a wide temperature and environment change, however, suggests that this is inherent in the original samples and not due to corrosion. (No unused sample was analyzed.) There is no indication of magnesia leaching. Thus, these samples show outstanding chemical stability.

The samples numbered 52 compared new and used Zirbeads. As with samples 14A-C, there appear to be inherent composition differences between the interior and surface locations. The surface analysis of the used Zirbead shows a layer of metallic oxide corrosion products, consistent with the observed discoloration. 500× scanning electron microscopy showed no penetration of the deposition to the interior, and gave no indication of interior attack. This observation most likely indicates that the 7% porosity of the Zirbeads is not connected. It should be noted that the Ni, Cr, and Fe in the surface layer arose from corrosion of other components within the test chamber.

The samples numbered 56A-58 show the performance of a third type of magnesia PSZ. In this case, the two samples exposed at 580° C., 56A and B, evidence some leaching of MgO. With only a single time data point on this material, it is unknown whether this leaching was a continuous process or one that had stopped or would stop at a certain point. Sample 56A also showed significant penetration of the foreign elements Ni and Cl. Despite this, there was no apparent degradation in physical integrity.

It should be noted that the EDAX results, in general, show magnesia levels lower than expected based on the compositions reported by manufacturers (Table I), even for unused samples. The reason for this discrepancy is unknown, but the results are believed to at least correctly indicate trends.

We claim:

1. A process for high temperature water oxidation of combustible corrosive material in a high temperature water oxidation apparatus, in which during at least part of the oxidation, corrosive material is present and contacts the apparatus over a contact area on the apparatus, the process comprising contacting in an aqueous phase the combustible corrosive material and an oxidizing agent under conditions suitable to cause the combustion of the combustible corrosive material, wherein the combustion is at a temperature range of about 400° C. to about 650° C. and at pressures from about 27.5 bar (400 psi) to about 345 bar (5000 psi), and the contact area comprises a zirconia based ceramic.

2. The process of claim 1 wherein the zirconia based ceramic has a porosity of about 10 percent or less.

3. The process of claim 1 wherein the corrosive material comprises at least one moiety selected from the group consisting of Cl, $SO_4$, $NO_3$, $PO_4$, $BO_2$, Br, OH, $CO_3$ and at least one moiety selected from the group consisting of H, Na, K, Ca, and Mg.

4. The process of claim 3 wherein the corrosive material comprises at least one selected from the group consisting of HCl, $H_2SO_4$, $HNO_3$, $H_3PO_4$, NaOH, $Na_2CO_3$, and salts of at least one selected from the group consisting of Na, K, Ca, and Mg.

5. The process of claim 1 wherein the ceramic comprises in the range of about 70 to about 100 weight percent zirconia.

TABLE 6

EDAX Analysis of Zirconia Samples

| Sample | Description | Exposure Temperature | Analysis Location | Ca | Cl | Cr | Fe | Hf | Mg | Ni | Si | Zr |
|---|---|---|---|---|---|---|---|---|---|---|---|---|
| 14A | Coors TTZ | 580 | Interior | — | — | — | — | 4.01 | 0.95 | — | — | 95.04 |
|  |  |  | Surface | — | — | — | — | 3.54 | 1.14 | — | — | 95.32 |
| 14B | Coors TTZ | 430 | Interior | — | — | — | — | 4.50 | 0.98 | — | — | 94.52 |
|  |  |  | Surface | — | — | — | — | 3.80 | 0.96 | — | — | 95.24 |
| 14C | Coors TTZ | 220 | Interior | — | — | — | — | 3.61 | 0.93 | — | — | 95.45 |
|  |  |  | Surface | — | — | — | — | 3.07 | 0.92 | — | — | 96.01 |
| 52 | Zircoa Zirbeads | 580 | Interior | 0.87 | — | — | — | 4.20 | 0.86 | — | 0.24 | 93.83 |
|  |  |  | Surface | — | — | 2.25 | 4.02 | 3.64 | — | 11.78 | 0.16 | 78.16 |
| 52 unused | Zircoa Zirbeads | NA | Interior | 0.65 | — | — | — | 4.48 | 1.02 | — | 0.09 | 93.76 |
|  |  |  | Surface | 0.55 | — | — | — | 2.53 | 2.76 | — | 0.84 | 93.32 |
| 56A | Zircoa Zycron G | 580 | Interior | — | — | — | — | 2.98 | 1.65 | — | — | 95.37 |
|  |  |  | Surface | — | 1.87 | — | — | 4.32 | 0.83 | 1.08 | — | 91.91 |
| 56B | Zircoa Zycron G | 580 | Interior | — | — | — | — | 3.06 | 1.56 | — | — | 95.38 |
|  |  |  | Surface | — | — | — | — | 4.84 | 0.91 | — | — | 94.25 |
| 57 | Zircoa Zycron G | 430 | Interior | — | — | — | — | 2.06 | 1.23 | — | — | 96.70 |
|  |  |  | Surface | — | — | — | — | 3.94 | 1.20 | — | — | 94.87 |
| 58 | Zircoa Zycron G | 220 | Interior | — | — | — | — | 4.11 | 1.00 | — | — | 94.89 |
|  |  |  | Surface | — | — | — | — | 4.15 | 1.16 | — | — | 94.69 |

6. The process of claim 1 wherein the oxidation apparatus comprises a reactor selected from the group of reactors consisting of vessel reactors, hydraulic column reactors, and pipe reactors.

7. The process of claim 6 wherein the corrosive material contacts at least a portion of the reactor over a reactor contact area on the reactor, and at least a portion of the reactor contact area comprises zirconia based ceramic.

8. The process of claim 1 wherein the oxidation is at temperatures in the range of about 500° to about 650° C., and at pressures in the range of about 27.5 bar (400 psi) to about 275 bar (4000 psi).

9. The process of claim 1 wherein the contact area comprises loose fill material comprising zirconia based ceramic.

10. The process of claim 1 wherein the contact area comprises zirconia based ceramic brick.

11. The process of claim 1 wherein the contact area comprises a zirconia based ceramic lining.

12. The process of claim 11 wherein the lining is comprised of zirconia based ceramic brick.

13. The process of claim 1 wherein the contact area comprises a zirconia based ceramic coating.

14. The process of claim 1 wherein the contact area comprises zirconia based ceramic that has been cast or machined.

15. The process of claim 1 wherein the oxidation is at temperatures in the range of about 400° to about 650° C., and at pressures in the range of about 27.5 bar (400 psi) to about 345 bar (5000 psi).

16. A process for high temperature water oxidation of combustible corrosive material in a high temperature water oxidation apparatus, in which during at least part of the corrosive material is present and contacts the apparatus over a contact area on the apparatus, the process comprising contacting in an aqueous phase the combustible corrosive material and an oxidizing agent under conditions suitable to cause the combustion of the combustible corrosive material, wherein the combustion is at temperatures exceeding 300° C., and at pressures exceeding about 27.5 bar (400 psi), and the contact area comprises a zirconia based ceramic which is stabilized with at least one stabilizing agent selected from the group consisting of yttria, calcia and magnesia.

17. The process of claim 16 wherein the zirconia based ceramic has an amount of stabilizing agent necessary to render it partially stabilized at the oxidation conditions.

18. A process for high temperature water oxidation of combustible corrosive material in a high temperature water oxidation apparatus, in which during at least part of the corrosive material is present and contacts the apparatus over a contact area on the apparatus, the process comprising contacting in an aqueous phase the combustible corrosive material and an oxidizing agent under conditions suitable to cause the combustion of the combustible corrosive material, wherein the combustion is at temperatures exceeding 300° C., and at pressures exceeding about 27.5 bar (400 psi), and the contact area comprises a zirconia based ceramic which is stabilized with magnesia.

* * * * *